July 20, 1954 B. FOX 2,684,478

FREQUENCY CONTROL FOR PULSED GENERATORS

Filed June 24, 1943 2 Sheets-Sheet 1

INVENTOR.
BENJAMIN FOX
BY William D. Hall
ATTORNEY

FREQUENCY CONTROL FOR PULSED GENERATORS

Filed June 24, 1943 2 Sheets-Sheet 2

INVENTOR.
BENJAMIN FOX
BY William D. Hall.
ATTORNEY

Patented July 20, 1954 2,684,478

UNITED STATES PATENT OFFICE 2,684,478

FREQUENCY CONTROL FOR PULSED GENERATORS

Benjamin Fox, Belmar, N. J., assignor to the United States of America as represented by the Secretary of War Application June 24, 1943, Serial No. 492,021

30 Claims. (Cl. 343—17.1)

(Granted under Title 35, U. S. Code (1952), sec. 266)

The invention described herein may be manufactured and used by or for the Government for governmental purposes, without the payment to me of any royalty thereon.

This invention relates to electronic circuits and methods, and more particularly to indicating and control systems and the application thereof to equipment of the type used for the determination of the speed and position of objects.

In accordance with conventional methods of object location, a normally blocked transmitter system, i. e. one which has a suppressed carrier, is periodically keyed for short time intervals so that pulses of wave energy are periodically transmitted in a desired direction. Any object or body in the path of said energy will reflect or reradiate a portion of the signal back to the source. Due to the transit time of said signal, the time interval between the transmitted pulse and the received echo pulse is a measure of the distance of the reflecting object. Similar techniques using radio or acoustic waves are also used for terrain clearance indication, ground speed indication, depth sounding, etc.

It is desirable to provide some means for preventing or compensating for the frequency drift of both the transmitter and receiver used in such equipment.

Conventional crystal control methods are, however, not feasible due to the extremely high frequencies involved. In accordance with this invention, signal responsive means is provided for automatically indicating or correcting the tuning of either transmitter or receiver in response to a shift in such tuning from the desired frequency.

Conventional automatic frequency control (AFC) systems of this type, as applied to continuous carrier systems, use a discriminator, connected into the intermediate frequency (I. F.) circuit of the receiver, which controls a tuning correcting means connected across the tank circuit of the local oscillator of the receiver. The discriminator generates a D. C. potential which varies in magnitude as a function of the departure of the I. F. from the desired mean value and varies in polarity as a function of the direction of said departure. The D. C. potential controls the tuning correcting means, which can be of the electronic reactance type or of the mechanical type driven by a reversible motor, in such direction as to retune the local oscillator of the receiver until the I. F. reaches the desired mean value, at which value the D. C. output of the discriminator is zero. For more detailed treatment of such systems, reference is made to the article by Foster and Seeley, Proc. I. R. E., March 1937, pp. 289 et seq. and the article by Hans Roder, Proc. I. R. E., May 1938, pp. 590 et seq.

One difficulty with A. F. C. systems of this type is that strong interfering signals on adjacent frequencies, which are within the pass-band of the I. F. amplifier, will tune the receiver away from the desired frequency. It is an object of the invention to provide an automatic frequency indicating and/or control circuit for use with suppressed or intermittently modulated carrier wave systems.

It is a further object of the invention to provide in such systems an automatic frequency indicating and/or control circuit which is operative only when said intermittent signals occur whereby the effects of interfering signals and noise are reduced.

It is a further object of the invention to provide an automatic frequency control and/or indicating system which will be responsive only to a desired transmitted or received signal.

Another object of the invention is to provide an automatic frequency control system for use with pulse-echo object location systems which will be operative only during the period of transmission or the period of reception of the desired signal.

Another object of the invention is to provide an automatic frequency control system for use with pulse-echo type of object location systems, which is responsive solely to the transmitted pulse or solely to a desired echo pulse.

Another object of the invention is to provide an automatic frequency control system, for use with pulse-echo object location equipment, which is responsive only to signals above a predetermined amplitude, such as a strong transmitted pulse.

Another object of the invention is to provide an automatic frequency control system, for use with a pulse-echo type of object location equipment, which is so connected with relation to such equipment that it is not affected by any received signals.

Another object of the invention is to provide in pulse-echo systems means to automatically control the frequency, volume or other characteristic of such system, said means being responsive only to the transmitted pulse or a desired echo.

Another object of the invention is to provide pulse-echo means for indicating the relative speed of motion of one of a plurality of objects said means being selectively responsive only to the transmitted pulse or a selected one of a plurality of echoes from said objects.

Another object of the invention is to provide an electronic switch or gate which also has a limited output.

Another object of the invention is to provide a frequency discriminator for automatic frequency control and/or indication which is suitable for suppressed carrier equipment and is responsive only to signals above a predetermined amplitude.

In accordance with one form of the invention, the automatic frequency indicating or control circuit is connected to the I. F. circuit through a normally blocked amplifier or "gate." This gate is made conducting only during intervals when either pulses are being transmitted or desired echoes are being received. As a modification, the gate can be omitted and the frequency responsive network biased highly negative so that only the peaks of a very strong signal, such as the transmitted signal, will overcome said bias and affect the discriminator.

In accordance with another form of the invention, a separate mixer, connected directly to the transmitter and to the local oscillator, is used to derive the I. F. which in turn energizes the frequency discriminator.

In accordance with still another form of the invention, the transmitter comprises a continuously operating master oscillator coupled to a normally blocked R. F. power amplifier, the output of which is applied to the antenna. Pulses from a keyer periodically render the R. F. power amplifier conducting so that pulse signals are transmitted. The output of the master oscillator is also directly combined with the output of the local oscillator of the receiver in a separate mixer. The I. F. output of this mixer is in turn used to energize the frequency discriminator.

For a better understanding of the invention, together with other and further objects thereof, reference is had to the following description taken in connection with the accompanying drawings, wherein like parts are indicated by like reference numerals, and its scope will be pointed out in the accompanying claims.

Figure 4:
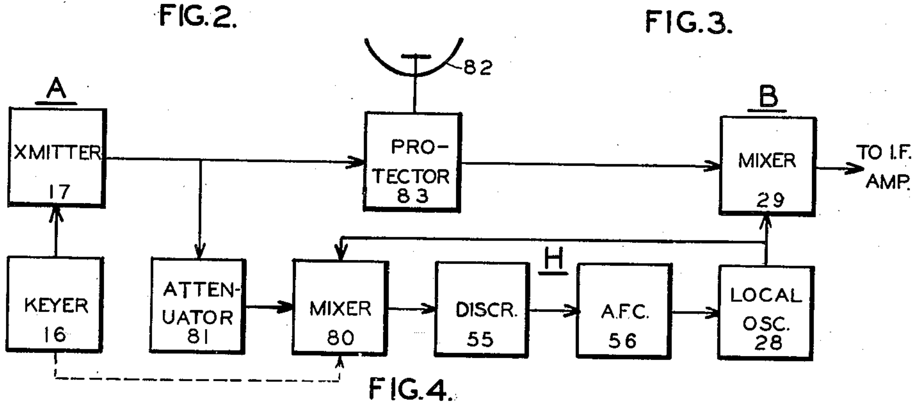
Figure 5:
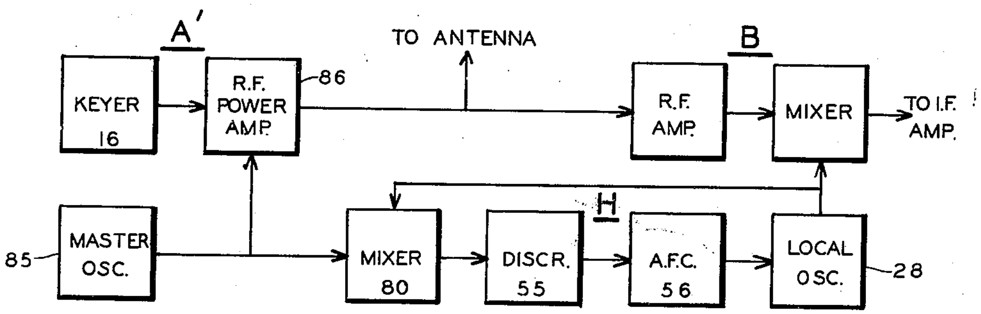
Figure 6:
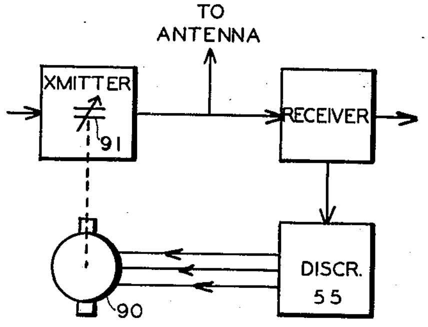

Figure 4, 5, and 6 are block diagrams illustrating modifications of my invention.

Figure 1:
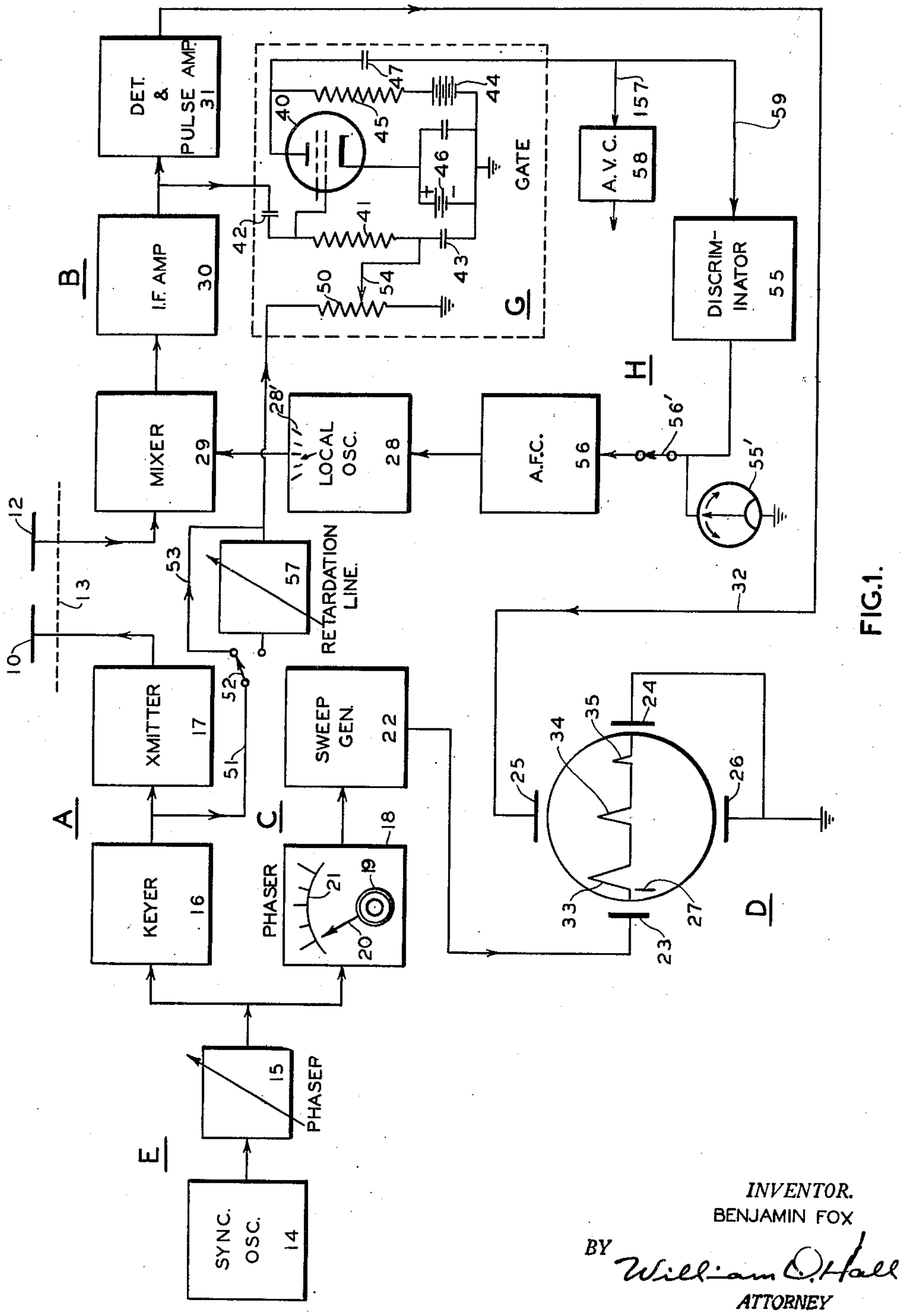
Figure 1 is a block diagram showing one form of my invention applied to a conventional pulse echo object detection system.

Reference is now made to Figure 1, wherein the invention is shown applied to an otherwise conventional type of pulse-echo system, including a transmitter channel A, coupled to an antenna 10, and receiver channel B, coupled to an antenna 12. Both antennas are sharply directional arrays and have a common reflecting screen 13. Instead of two antennas, a single antenna may be used for both transmitter and receiver. The output of the receiver feeds into an oscilloscope D, the beam of which is periodically displaced by means of a sweep voltage from channel C. A synchronizing channel E synchronizes the transmitter and sweep voltage channels.

The synchronizing channel E includes an oscillator 14 which generates a sine wave, generally in the audio frequency region. The sine wave is applied, through an adjustable phase shifter 15, to the transmitter channel A, which includes a keyer-modulator 16 and a normally blocked transmitter 17. Keyer 16 includes a pulse generator which at every cycle, or every few cycles, of energy from oscillator 14 generates a sharp pulse of considerably shorter duration than said cycle. The resultant output of said pulse generator is a series of sharp pulses of short duration spaced at intervals of considerably longer duration. These pulses are amplified and applied as a positive bias to a normally blocked radio frequency transmitter 17, which generates trains of ultra high frequency oscillations for the duration of each pulse.

The output of phase shifter 15 is also applied to sweep voltage channel C comprising an adjustable phase shifter 18, the control shaft of which is provided with a control knob 19, to which is attached a pointer 20 moving along a scale 21. The sine wave output of phase shifter 18 is applied to a sweep generator 22 which generates a saw tooth voltage at every cycle of the sine wave. This saw tooth voltage is applied to the horizontally deflecting plates 23 and 24 of a conventional cathode ray oscilloscope indicator D, which also includes a pair of vertically deflecting plates 25 and 26. By adjusting phase shifter 18, any desired point of the oscilloscope sweep can be synchronized with the pulsing of transmitter 17.

For more detailed descriptions of suitable types of transmitter and keyer-modulator networks in channel A reference is made to the applications of J. R. Moore, Serial Nos. 467,268, now U. S. Patent 2,464,252, and 467,269, now U. S. Patent 2,462,885, both filed November 28, 1942; J. W. Marchetti, Serial No. 477,782, now U. S. Patent 2,597,013, filed March 3, 1943; and M. D. Baller, Serial No. 477,103, now U. S. Patent 2,497,844, filed February 25, 1943. For details of circuits suitable for use in the oscilloscope sweep channel C, reference is made to the applications of J. R. Moore, Serial Nos. 467,263, now U. S. Patent 2,605,464, and 467,264, now abandoned, both filed November 28, 1942. It is to be distinctly understood, however, that other known forms of these networks are equally applicable.

Receiver channel B is tuned to the transmitter frequency. It may be of the straight tuned radio frequency type but is preferably of the superheterodyne type, as shown. The signals from antenna 12 are heterodyned with the output of a local oscillator 28 in mixer 29, which can also be preceded by one or more R. F. amplifiers (not shown) tuned to the received signals. Well known means, such as spark gap networks or limiting amplifiers can also be connected ahead of the mixer to protect the receiver from the relatively powerful direct signal from the transmitter. The resultant intermediate frequency output of mixer 29 is filtered and amplified by I. F. amplifier 30. The pulse component of the signal is then detected and amplified by network 31 and impressed through lead 32 to the vertically deflecting plates 25 and 26 of oscilloscope D.

Referring now to the operation of the system, the pulses of R. F. energy from transmitter 17 are radiated through antenna 10 and directly picked up by receiver antenna 12. The energy is also radiated from the antenna and, upon striking an object, is reflected or reradiated back toward antenna 12. Both transmitted and received pulses therefore appear in the receiver output and vertically deflect the oscilloscope trace. Due to the transit time of the received pulses, the indication of the main transmitted pulse will appear separated from a reflected pulse indication by a distance proportional to said transit time and hence the distance of the reflecting object. Thus indications 34 and 35 respectively represent echoes of the same transmitted pulse indication 33 from two objects at different distances from the source of pulse transmission.

The distance of said object can be indicated by means of suitable calibrations on the oscilloscope. Or, the distance can be measured by adjusting calibrated phase shifter 18 so that the transmitted pulse indication 33 is positioned at a given datum position 27 of the trace. The pointer 20 is then disconnected from the phase shifter shaft, reset to zero on the scale 21, and then reconnected to said shaft so that zero reading represents the datum position. The phase shifter is then readjusted until the received echo pulse indication 34 or 35 is moved to the same datum position 27 and the reading on scale 21 noted. The transit time of the reflected signal can then be determined by the new position of the pointer on the scale. Since said transit time is the equivalent of a phase shift, scale 21 can be calibrated directly in terms of distance. For further details of this method, reference is made to the application of S. H. Anderson, Serial No. 470,376, now abandoned, filed December 28, 1942.

The term "echo" as used herein is not to be restricted to signals which are reflected or passively reradiated by a body. This term is also used to signify any response to a signal, e. g. those obtained by means of a normally inoperative transmitter located on said body and which, when keyed by the transmitted pulse, automatically functions to send an answering pulse, either on the same or on a different frequency.

As thus far described, the system is conventional and forms a part of this specification only for the purpose of describing one typical system to which the present invention is applicable. As above indicated, it is difficult, if not impossible, to apply the usual crystal control to the receiver or transmitter oscillators in such systems, especially if it is desired to provide for changing the operating frequency of such systems. As a result the operating frequency drifts considerably with changes in temperature, electrode potentials, etc., especially during the "warm up" period. To overcome this difficulty it has heretofore been necessary to use receivers having channels of considerably wider band pass than necessary for handling a desired pulse so that frequency drift in the oscillators will not shift the I. F. signal and its sidebands out of the acceptance band of the I. F. amplifier. Such wide band receiver channels make the system more susceptible to noise currents and to interfering signals in neighboring channels or deliberate jamming signals. These objectionable features can be considerably reduced by use of the present invention which will now be described.

Referring again to Figure 1, the I. F. output of the receiver is applied through a normally blocked amplifier or "gate" G to an automatic frequency control and/or indicating circuit H which so controls the frequency of the local oscillator 28 that the frequency of the I. F. output of the receiver is kept substantially constant regardless of any shift in the frequency of the transmitted signal or of the local oscillator or both.

Gate G comprises a triode or multigrid tube 40, the control grid of which is excited by the I. F. voltage impressed upon a resistor 41 through coupling condensers 42 and 43 having low impedance to the I. F. energy. The plate circuit of tube 40 is excited by a source of B voltage supply 44 through a high resistance 45. The signal output of said plate circuit is impressed upon the discriminator 55 through a blocking condenser 47, of low impedance to I. F. currents. Gate G is normally biased below plate current cutoff by means of a potential source 46 which biases the grid highly negative with respect to the cathode.

The positive voltage of keyer-modulator 16 is applied through lead 51, the upper position of switch 52, lead 53, and across potentiometer 50. A portion of this positive voltage, determined by the position of slider 54 of the potentiometer, is applied to the grid of tube 40 in such direction as to oppose and overcome the cutoff bias from voltage source 46. As a result gate G is made conductive during the periods when the transmitter is operating. The I. F. output of this gate is applied through blocking condenser 47 to discriminator 55 which in turn controls the A. F. C. network. The time constant of discriminator 55 should preferably be considerably longer than the interval between pulses so as to prevent appreciable decay of the output voltage during said interval.

As a modification, gate G can be rendered nonconducting by normally using zero or insufficient plate voltage. The positive voltage pulse from the keyer can then be impressed upon the plate circuit to increase said plate voltage and render the gate conducting for the duration of the keyer voltage.

With the switch 52 in the upper position, gate G is opened in synchronism with the transmitted signal. With switch 52 in the lower position, the pulse is passed through an adjustable retarding network 57. By adjusting this network the pulse from the keyer can be retarded slightly so as to compensate for possible delay of the transmitted pulse trains in the antenna transmission networks and receiver circuits so that the unblocking voltage can be adjusted to be in more exact synchronism with the occurrence of the pulse trains in the input circuit of the gate G.

The retardation network 57 is useful for still another purpose. By still further retarding the keyer pulse, gate G can be unblocked in synchronism with any desired echo signal. This will have the effect of controlling the automatic frequency control channel H in accordance with the frequency of any desired echo pulse so that the receiver will stay tuned to said echo. The frequency of a reflected echo is the same as that of the transmitted signal only for stationary targets. If such targets are moving very rapidly, then the echo signal frequency can be considerably different from the transmitted frequency due to the Doppler effect. Since the frequency difference is a function both of the frequency of the transmitted signal frequency and the speed of the target, said difference can be of the order of several kilocycles when wave lengths in the centimeter region and speeds of several hundred miles per hour are involved. The percentage frequency difference due to the Doppler effect can be even higher where supersonic acoustic waves are involved. Thus, with the method above described, the receiver tuning will follow the frequency of any desired echo whether it is of the reflected type or the retransmitted type as above explained. This will leave the receiver partially detuned from the powerful directly transmitted signal and thus provide additional receiver protection.

Retardation network 57 may be of the well known multiple section filter type or it may be of the electronic type operating in accordance with Figure 17 on page 50 of the August 1942 issue of "Electronics" magazine.

As shown, gate G is a resistance coupled electron tube which may or may not amplify the signal. It may also be tuned to the intermediate frequency. Several such stages may also be connected in cascade, some or all of said stages being normally blocked and then rendered conducting by the keyer voltage.

Discriminator 55 and A. F. C. network 56 are standard components which may be of the type disclosed in the Proc. I. R. E. papers above mentioned. Other suitable networks are disclosed in the patents to Case, 2,163,243; Travis, 2,240,428; Rath, 2,263,645 and 2,269,687; and White, 2,283,523.

The A. F. C. network 56 is preferably of the electronic reactance type shunted across the tank circuit of the local oscillator. If the operating frequency of said oscillator is too high to be effectively controlled by a reactance tube, then the oscillator can be operated at a submultiple of the necessary frequency and a harmonic thereof applied as a heterodyning frequency to the mixer. Or a mechanical type of A. F. C., such as disclosed in the patents to Katzin, 2,232,390 and Morrison, 2,250,104, can be used to adjust the main tuning element or a small vernier tuning element of the oscillator.

In some cases, especially at very high frequencies, A. F. C. network 56 can be eliminated entirely and the voltage output of discriminator 55 used directly to vary one or more electrode potentials of the local oscillator. This method is especially suitable for Barkhausen or Klystron oscillators, the frequency of which can be readily varied by variation in electrode potentials. Automatic frequency control is very desirable for use with such oscillators since it will automatically compensate for frequency variations due to voltage changes in the electrode potential sources used therewith.

The gated output of network G can also be applied through a lead 157 to a conventional automatic amplitude or volume control network (A. V. C.) 58 which tends to keep the output of the receiver substantially constant regardless of the amplitude of the signals. Such networks develop a negative potential, proportional to the strength of the signal, which is used to vary the amplification of the R. F. mixer, or I. F. channels or a combination of said channels.

By making the A. V. C. fast acting, so that it will follow the pulse signal envelope, and by opening gate G in synchronism with the transmitted pulses in the manner above described, the amplification of the receiver channels will be reduced considerably during operation of the transmitter and thus provide additional protection for the receiver components. By opening gate G in synchronism with a desired echo, the receiver saturating effects of strong interfering signals can be considerably reduced so that weaker echoes can still be indicated.

By making the A. V. C. slow acting, i. e. providing a long time constant circuit in the A. V. C. output circuit, the amplitude of the A. V. C. potential can be made proportional to the amplitude of the selected echo. This will serve to keep the receiver sensitivity at the minimum level required by the selected echo so that the effects of noise and interfering signals can be reduced, especially if said echo is strong.

The A. V. C. can also be provided with an adjustable delay bias which is overcome only by signals above a predetermined amplitude. In this manner the receiver can be left at maximum sensitivity for weak echo signals, while such sensitivity will be reduced for strong echo signals or for the main transmitted pulse.

The various types of A. V. C. networks above discussed are well known and do not per se constitute a part of this invention. Other well known types of receiver or transmitter control networks, e. g. automatic selectivity control networks, can be used in combination with the gating circuit in this manner.

If desired, the gating network G can also be made to act as an amplitude limiter so that the input to discriminator 55 is constant regardless of the amplitude of the input signals. The output of the discriminator will then be solely proportional to the frequency and substantially independent of the amplitude of the signal. This can be done by reducing the voltage of B supply 44 to provide early saturation or by adjusting slider 50 so that the unblocking voltage increases to such an extent that a signal above a predetermined amplitude drives the grid positive; or both expedients can be used.

This expedient should, however, not be used if A. V. C. or other networks which depend on the amplitude of the signal are also fed from the output of the gating circuit. Instead, a separate amplitude limiting circuit, such as disclosed in the Case patent above cited, can be inserted in lead 59 so that it is in cascade with only discriminator network 55.

A zero center voltmeter 55' may be used to indicate the polarity and magnitude of the discriminator voltage. This meter can be used in conjunction with A. F. C. reactance 56 to serve as a check on the proper operation thereof. Or, by opening switch 56', it can be used alone as a resonance indicator where automatic frequency control is not desired. Resonance indicating means of the non-polarized type, e. g. "magic eye," can also be connected to the output of the A. V. C. circuit 58 in the conventional manner.

The discriminator 55 and zero center meter 55' can also be used in conjunction with the receiver to determine the relative speed of a moving body by measuring the frequency displacement of the echo from said body due to the Doppler effect. This can be done by first opening switch 56' so that the A. F. C. does not function. Switch 52 is then placed in the upper position, so that gate G is opened in synchronism with the transmitted signal, and the local oscillator 28 adjusted until the pointer of meter 55' is at the zero position. At this point the receiver is exactly tuned to the transmitter frequency, which can be read on the calibrated scale 28'.

Switch 52 is now shifted to the lower position and retardation network 57 adjusted until gate G opens up in synchronism with the desired echo. The oscillator 28 is now retuned until meter 55' again reads zero. The difference in the two readings of scale 28' will be a measure of the Doppler shift. Scale 28' can be calibrated in terms of frequency or in terms of relative speed or both.

The second retuning of the local oscillator can be eliminated if meter 55' is calibrated in terms of frequency difference or relative speed. If this is done it will be necessary to use an amplitude limiter ahead of discriminator 55.

To make network H responsive to very small frequency shifts, either for measuring or control purposes, when high intermediate frequencies are used, it is desirable to first reduce the I. F. so as to increase the percentage of any frequency shift. This can be done by inserting an additional heterodyne converter or frequency changer in lead 59 and making frequency discriminator 55 responsive to the reduced I. F. For further details of this method, reference is made to Travis Patent 2,294,100, particularly Fig. 1 thereof.

With the expedients above described interfering signals can reach the automatic control circuits only if they are in substantial synchronism with the unblocking pulse applied to gate G. If this should happen, such synchronism can be destroyed by adjustment of phase shifter 15 so as to shift both the pulsing time of the transmitter and the unblocking interval. Or, the frequency of oscillator 14 can be changed to alter the repetition rate of the transmitted signals. However, since synchronism between the desired and interfering signals is extremely unlikely, pulse shifter 15 can usually be omitted.

As a simplification, the network for impressing a voltage from the keyer upon the gate can be omitted and the gate made responsive only to strong signals of the order of amplitude of the direct signal from the transmitter. This can be done by adjustment of the negative biasing voltage 46 to such an extent that only signals above a predetermined amplitude will render tube 40 conducting. Thus channel H will be controlled solely by the strong transmitted signals since the relatively weaker interfering signals will not get through.

Another way of operating the gate is to make its responsiveness dependent upon the combined amplitudes of both the keyer voltage and the signal. Thus the negative bias voltage 46 will be made so high that the positive voltage taken from potentiometer 50, which may be applied to either the grid circuit or plate circuit, or both, will still be insufficient to render the gate conducting except to signals above a predetermined amplitude, such as the direct signals from the transmitter. The amplitude limiting feature above described can also be applied to this gating method.

As a further simplification, gate G can be entirely eliminated by making discriminator 55 also operate as a gate. For a description of one such circuit, reference is made to Figure 2. The output of I. F. amplifier 30 is applied directly to the series connected primaries of two transformers 60 and 61. The secondary of transformer 60 is tuned by condenser 62 to a predetermined amount below the desired intermediate frequency while the secondary of transformer 61 is tuned by condenser 63 an equal amount above the desired intermediate frequency. Both transformers should preferably be shielded from one another to reduce the coupling between them to a minimum.

Figure 3:
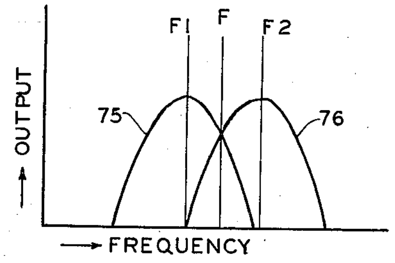
Figure 3 is a graph illustrating the operation of the circuit in Figure 2.

In Figure 3, curves 75 and 76 show the frequency response of transformers 60 and 61 respectively. The center frequencies F1 and F2 of said curves are equally spaced from the line F, which represents the center frequency of the I. W. amplifier 30. These curves overlap at frequency F so that the transformer outputs are equal at said frequency and vary in an opposite manner between F1 and F2.

The outputs of transformers 60 and 61, after being amplified if necessary, are separately applied to triode detectors 64 and 65 having equal load resistors 66 and 67 shunted by R. F. bypass condensers 68 and 69. These condensers have a low impedance to the R. F. components but a high impedance to the pulse components so that the latter develop voltages across load resistors 66 and 67. A common plate source 70 and negative grid source 71 are used and are shunted by R. F. bypass condensers 72 and 73. The time constants of networks 66—68 and 67—69 should preferably be considerably longer than the intervals between pulses so that the voltages developed should not decay appreciably during said intervals.

Referring now to the operation of this circuit, assume that both transmitter and receiver are exactly tuned to each other so that the output frequency of the I. F. amplifier is shown by line F in Figure 3. At this frequency the outputs of transformers 60 and 61, and hence the voltages across load resistors 66 and 67, are equal. Since said voltages oppose each other, the resultant voltage across output leads 74 is zero and hence it will have no effect on the A. F. C. reactance (Fig. 1).

Should the intermediate frequency decrease toward the region F1, due to a change in frequency of either the transmitter or local oscillator, then the voltage across resistor 66 will increase and the voltage across resistor 67 will decrease. The resultant voltage at leads 74 will therefore be negative and will vary A. F. C. reactance 56 in such direction as to bring the intermediate frequency back toward F. The reverse will happen if the intermediate frequency rises toward F2.

Figure 2:
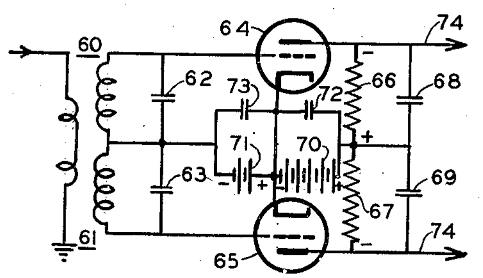
Figure 2 is a schematic diagram of a novel discriminator network particularly suitable for suppressed carrier systems.

The discriminator circuit in Figure 2 is made responsive only to signals having a high amplitude of the order of the amplitude of the transmitted signal by making the grid potential source 71 highly negative so that tubes 64 and 65 are biased below plate current cutoff to such an extent that only signals strong enough to overcome said bias will render said tubes conducting. Hence, interfering signals, which in substantially all cases are bound to be weaker than the transmitted signal, will have no substantial effect on the tuning of the receiver.

Grid biasing battery 71 can be eliminated and a grid leak resistor substituted therefor. As a result, strong signals will cause grid current to flow and a high negative grid bias voltage will develop across condenser 73, which voltage will prevent weaker interfering signals from affecting the triodes. The time constant of such condenser and leak should be made considerably longer than the intervals between pulses so that said bias will not decay appreciably during said intervals.

The discriminator can also be placed under the control of the keying voltage. This can be done by making the negative blocking voltage 71 so high that it will remain blocked for all signals. The positive keyer voltage from potentiometer 50 will then be applied to the discriminator grid circuit or plate circuit, or both, in such direction as to overcome said blocking voltage in synchronism with either the direct signal from the transmitter or any desired echo. Or, said negative blocking voltage can be made so high that it will be overcome only by the combined amplitudes of the signals and the keyer voltages. In other words, the expedients used with gate G can also be used with discriminator 55, so that the former can be eliminated entirely if desired or necessary. However, it is preferable to separate the gating and discriminating function.

The above described methods of applying a delay bias to the discriminator are not restricted for use with the circuit in Figure 2. They may be applied to any of the discriminators shown in the publications and patents above cited.

Figure 4 illustrates another embodiment of the invention. Instead of feeding the A. F. C. networks from the I. F. output of the receiver, as in Figure 1, said networks are so arranged in the system that they are least likely to be affected by the received signals. In accordance with this embodiment, a separate mixer 80 is fed directly from transmitter 17, through an adjustable attenuator 81, and from local oscillator 28. The beat frequency difference in the output of mixer 80 is therefore the same as the output of receiver mixer 29. The output of mixer 80 is used to control the discriminator 55 and A. F. C. network 56 which function to control the local oscillator in exactly the same manner as in Figure 1.

The transmitter and receiver channels A and B are both coupled to a common directional antenna 82 through a protector network or duplexing circuit 83. Circuit 83 is essentially an electronic switching means which in effect alternately serves to effectively couple the antenna to the receiver and transmitter channels. Since network 83 is not per se a part of this invention and is well known in the art, no detailed showing of network is considered necessary. In general, networks of this type are essentially transmission lines incorporating spark gaps or gas discharge tubes which break down during pulse transmission so that the impedance between the antenna and the transmitter is minimum and the impedance between the antenna and the receiver is maximum. When transmission ceases, the gas tube recovers and the above impedance relations are reversed. Another type of protector network that may be used is disclosed in the application of James R. Moore, Serial No. 467,270, now U. S. Patent 2,480,872, filed November 28, 1942.

The mixer 80 cannot therefore be greatly affected by any received signals, since during the reception interval the impedance between the antenna and the transmitter channel, to which mixer 80 is connected, is highest. Hence, the discriminator and A. F. C. networks will be controlled exclusively by the transmitter and local oscillator frequencies. Furthermore, in view of the powerful signal from the transmitter, the impedance of the attenuator can be made high enough to substantially eliminate any received signal that might be strong enough to get into the transmitter channel. Finally, to eliminate extremely powerful interfering signals, mixer 80 can be normally blocked by a high negative bias and opened up by a positive voltage from keyer 16, as indicated by the dotted line, in accordance with the methods described in connection with Figure 1.

Figure 5 illustrates still another embodiment of the invention. The transmitter channel A' in this figure is of the master oscillator-power amplifier type and includes a continuously operating master oscillator 85 which feeds a normally blocked R. F. power amplifier 86. Pulse transmission is accomplished by rendering amplifier 86 conducting for short intervals by positive pulses from keyer 16. Oscillator 85 may operate at the desired frequency or at a lower frequency which is multiplied to the desired frequency.

Mixer 80 is fed directly from oscillator 85 and local oscillator 28 so that it yields the intermediate frequency. The remainder of this circuit is the same as in Figure 4. It will be seen that mixer 80, in Figure 5, is in a position where it can at no time be reached by any received signals.

The discriminators in Figures 4 and 5 can also be used for frequency or resonance indication in the same manner as described in connection with Figure 1.

In the embodiments thus far described, the automatic frequency control has been indicated as applied to the local oscillator of the receiver. It can, instead, be applied to the transmitter. As shown in Figure 6, the output of discriminator 55 can be used to control a motor 90 which will retune the frequency controlling element 91 of the transmitter. Although element 91 is indicated as a variable condenser, it is to be understood that it may be whatever means determines the frequency of the type of transmitter used, e. g. inductances, tuned lines, cavities, electrode potentials, etc. The remaining elements in Figure 6 are connected in the same manner as in the other figures.

Instead of feeding the discriminator from the I. F. output of the receiver, which can be done only with superheterodyne receivers, it can also be operated by the signal frequency, which must be done in the case of straight tuned R. F. receivers. Where the signal frequency is very high, it is desirable to use discriminators using cavities or tuned lines such as disclosed in the Trevor Patent, 2,312,783. The system in Figure 6 is most suitable for this type of operation.

There have been described several methods, circuits, and suitable components for automatically indicating and/or controlling the frequency and other characteristics of a receiver or transmitter of a radio object location system in such manner that indication or control may be made selectively responsive to one of a group of signals and is not likely to be affected by interfering signals. It should be understood, however, that the same methods can also be applied to other types of object location systems including those using other than radio waves, e. g. sonic or supersonic waves in air or water. The circuits used with acoustic systems are essentially the same as those above described, the main difference being that said circuits energize sound wave radiators and receivers instead of antennas. The frequencies involved are also much lower than those used with radio waves. Said circuits are also applicable to terrain clearance indicators and to the other systems in which the signal is intermittently transmitted or intermittently modulated. Communication systems to which this invention is especially applicable are those in which several transmitters and receivers operate on a time sharing basis on the same channel, e. g. duplex and multiplex systems.

While there have been described what are at present considered preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. In a pulse-echo object location system comprising a normally inoperative transmitter of ultra high frequency radio waves, keying means for repeatedly rendering said transmitter operative for short time intervals separated by considerably longer time intervals, means to transmit said waves toward an object, and a superheterodyne receiver for both said transmitted waves and echo waves from said object, said receiver comprising a local oscillator, a mixer, a tuned intermediate frequency circuit and a demodulator for said waves connected to said intermediate frequency circuit; the improvement which comprises an electron tube biased beyond plate current cutoff and energized by the output of said intermediate frequency circuit, an automatic frequency control network energized by the output of said intermediate frequency circuit and comprising a frequency responsive discriminator connected to the output of said tube, a tuning control means for said local oscillator controlled by the output of said discriminator, and means for removing said cutoff bias on said tube in synchronism with either the period of transmission of said waves or the period of reception of said echoes, said last named means comprising means for impressing a voltage from said keying means upon said electron tube, and an adjustable retarding means for said voltage.

2. In a pulse-echo system comprising a normally inoperative transmitter, means to intermittently render said transmitter operative, means to radiate the output of said transmitter toward an object, and a receiver for said radiated waves and echo waves thereof, said receiver comprising a local oscillator and means to mix the received waves with the output of said oscillator to derive a beat frequency; the combination therewith of a frequency discriminating network excited by said beat frequency, said network including rectifying means responsive only to energy above a predetermined potential, means responsive to a variation of said beat frequency to provide an output from said rectifying means, which is related to the direction of said variation, and means controlled by said output for stabilizing said beat frequency.

3. In a pulse-echo system comprising a normally inoperative transmitter, means to intermittently render said transmitter operative at spaced time intervals for periods considerably shorter than said intervals to provide spaced pulses, means to radiate said pulses toward an object, and a receiver for said radiated pulses and echo waves thereof, said receiver comprising a local oscillator and means to mix the received waves with the output of said oscillator to derive a beat frequency; the combination therewith of a frequency discriminating network for said beat frequency including rectifying means normally biased so that it is responsive only to the radiated pulses, and means controlled by said network to stabilize said beat frequency.

4. In a pulse-echo system comprising a normally inoperative transmitter, means to intermittently render said transmitter operative at spaced time intervals for periods considerably shorter than said intervals, means to radiate the output of said transmitter toward an object, and a receiver for said radiated waves and echo waves thereof, said receiver comprising a local oscillator and means to mix the received waves with the output of said oscillator to derive a beat frequency; the combination therewith of a frequency discriminating network, excited by said beat frequency, the output of which is related to the direction of variation of said beat frequency, the time constant of said discriminator being at least as long as said intervals, and means responsive to the output of said discriminator to control the frequency of said local oscillator in such manner as to keep said beat frequency constant.

5. In a pulse-echo system comprising a normally inoperative transmitter oscillator, means to intermittently render said oscillator operative at spaced time intervals for periods considerably shorter than said intervals, means to radiate the output of said transmitter toward an object, and a receiver for said radiated waves and echo waves thereof, said receiver comprising a local oscillator and means to mix the received waves with the output of said oscillator to derive an intermediate frequency; the combination therewith of a frequency discriminating network excited by said intermediate frequency and having a load circuit the output of which changes in response to a variation of said heterodyne frequency, the magnitude of said change being substantially proportional to the amount of said variation and the direction of said change being related to the direction of said variation, the time constant of said load circuit being considerably longer than said intervals, means responsive to said output voltage to control the frequency of one of said oscillators in such manner as to keep said intermediate frequency constant.

6. A pulse-echo object detection system comprising a wave transmitter, a receiver for said waves and echoes thereof, a transducer for radiating said waves and for receiving echoes thereof, a switching circuit for alternately coupling said transducer to said transmitter during operating periods thereof and to said receiver during echo reception; said receiver comprising a local oscillator and a mixer for combining received waves with the output of said local oscillator, and translating means coupled to the output of said mixer; and an auxiliary control channel comprising a second mixer coupled at a point between said transmitter and switching circuit and coupled to said local oscillator for heterodyning the outputs of said transmitter and local oscillator to derive a resultant beat frequency, and a network responsive to said beat frequency and coupled to the output of said second mixer.

7. A pulse-echo object detection system comprising an intermittently operating ultra-high frequency radio wave transmitter, a receiver for said waves and echoes thereof, a directional antenna for radiating said waves and for receiving echoes thereof, a receiver protective circuit connected between said transmitter, receiver, and antenna for effectively coupling said antenna to said transmitter only during operating periods thereof and to said receiver during echo reception; said receiver comprising a local oscillator and a mixer for combining received waves with the output of said local oscillator, and translating means coupled to the output of said mixer; and an automatic frequency control channel comprising a second mixer coupled at a point between said transmitter and protective circuit and coupled to said local oscillator for heterodyning the outputs of said transmitter and local oscillator to derive a resultant beat frequency, a frequency discriminator excited by said beat frequency, and a frequency controlling network for said local oscillator and controlled by the output of said discriminator to stabilize said beat frequency.

8. A signalling system comprising a wave transmitter and a receiver tuned to the same frequency, and means for radiating said waves; said transmitter comprising a master oscillator and an amplifier excited thereby, and means to couple the output of said amplifier to said radiating means; said receiver comprising a local oscillator and a mixer for combining received waves with the output of said local oscillator, and signal translating means coupled to the output of said mixer; and an auxiliary channel comprising a second mixer coupled to said master oscillator and said local oscillator for heterodyning the outputs thereof to derive a resultant difference frequency, and a network responsive to said difference frequency and coupled to the output of said second mixer.

9. A pulse-echo object detection system comprising an intermittently operating ultra-high frequency radio wave transmitter, a receiver for said waves and echoes thereof, directional antenna means for radiating said waves and for receiving echoes thereof; said transmitter comprising a continuously operating master oscillator and a normally blocked amplifier excited thereby, and keying means for intermittently unblocking said amplifier so that it operates to amplify the output of said master oscillator and impress it upon said antenna; said receiver comprising a local oscillator, a mixer for combining received waves with the output of said local oscillator, and translating means coupled to the output of said mixer, and an automatic frequency control channel comprising a second mixer coupled to said master oscillator and said local oscillator for heterodyning the outputs thereof to derive a resultant difference frequency, a frequency discriminator excited by said difference frequency, and a frequency controlling network for one of said oscillators and controlled by the output of said discriminator to stabilize said difference frequency.

10. In combination, an intermittently operating wave generator, a normally blocked automatic frequency stabilizing means for said generator, and means to unblock said stabilizing means during the operating intervals of said generator.

11. In combination with a wave generator and modulating means therefor; the improvement which comprises a normally inoperative frequency stabilizing network for said generator and means controlled by said modulating means and independent of the output of said generator to render said stabilizing network operative.

12. In combination with a pulse-echo object location system having means for transmitting short trains of wave energy and common means for receiving the transmitted component and the echo component thereof; apparatus for automatically controlling the tuning of one of said means which comprises means for selecting energy from the output of said receiver during reception of only one of said components, and means responsive to said selected energy to control said tuning.

13. In combination with a pulse-echo object detection system having means for intermittently transmitting pulses of radio energy and common means for receiving transmitted pulses and echoes thereof; apparatus for automatically controlling the tuning of said system which comprises means for intermittently selecting energy from the output of said receiver in synchronism with said intermittent transmission and means responsive to said selected energy to control said tuning.

14. In combination with an object detection system having means for transmitting pulses of radio energy and common means for receiving transmitted pulse groups and echo pulse groups; apparatus for controlling the tuning of said receiving means which comprises means for selecting energy from the output of said receiver during reception of only one of said pulse groups, and means responsive to said selected energy to control said tuning.

15. In combination with a pulse-echo object detection system having means for transmitting pulses of wave energy and common means for receiving the transmitted pulses and echoes thereof; the combination therewith of means for adjusting the tuning of said receiving means, and means responsive to only said echoes to control said adjusting means.

16. In combination with a pulse-echo object detection system having means for transmitting pulses of radio energy and common means for receiving transmitted pulses and echoes thereof; apparatus for automatically controlling the tuning of said system which comprises means for selecting energy from the output of said receiver only while pulses are being transmitted, and means responsive to said selected energy to keep said receiving means substantially tuned to the frequency of said transmitted energy.

17. In combination with a pulse-echo object location system having means for transmitting short trains of radio waves and common means for receiving the transmitted waves and a plurality of echoes thereof, the energy of at least one echo having a frequency which is different from that of the transmitted waves; apparatus for automatically controlling the tuning of said system which comprises means for selecting energy from the output of said receiver during reception of said one echo, and means responsive to said selected energy to tune said receiving means substantially to the frequency of said selected energy.

18. In a pulse-echo system including a pulse transmitter and a receiver for said pulses and echoes thereof, said receiver including a local oscillator, a mixer, and a signal translating circuit connected to the output of the mixer, a common antenna for said transmitter and receiver, and a duplexing circuit interconnecting said transmitter, said receiver, and said antenna; the combination therewith of a second mixer for heterodyning the outputs of said transmitter and local oscillator, said second mixer being coupled at a point relative to said transmitter and duplex circuit where it can not be substantially affected by said echoes, and means excited by the output of said second mixer to stabilize the output frequency of said first mixer.

19. A pulse-echo object detection system comprising a circuit for transmitting spaced pulses of wave energy, a receiver including a cathode-ray tube for indicating said transmitted pulses and echoes thereof, a periodic time-base generating circuit for said tube, an automatic frequency control for said system, a circuit for intermittently coupling said automatic frequency control to said receiver, means for applying controlling oscillations to all of said circuits to synchronize the operation thereof, and means to simultaneously and equally shift the phase of said controlling oscillations in all of said circuits.

20. A pulse-echo object detection system comprising a circuit for transmitting spaced pulses of wave energy, a receiver including a cathode-ray tube for indicating echoes of said pulses, a periodic time-base generating circuit for said tube, means for applying controlling oscillations to both of said circuits to synchronize the operation thereof, and means to simultaneously shift the phase of said controlling oscillations in both of said circuits.

21. A pulse-echo object detection system comprising a circuit for intermittently transmitting wave energy, an automatic frequency control for said system, a circuit for intermittently coupling said automatic frequency control to said system, means for applying controlling oscillations to both of said circuits to synchronize the operation thereof, and means to simultaneously shift the phase of said controlling oscillations in both of said circuits.

22. A pulse-echo object detection system comprising a circuit for transmitting spaced pulses of wave energy, a receiver including an intermittently operating circuit, means for applying controlling oscillations to both of said circuits to synchronize the operation thereof, and means to simultaneously shift the phase of said controlling oscillations in both of said circuits to reduce the effects of interfering pulses on said system.

23. Electrical frequency control apparatus comprising an intermittently operating adjustable source of electrical oscillations, means coupled to said source for adjusting the frequency of said oscillations in accordance with an electric signal potential applied thereto, frequency sensitive means having an input circuit for receiving a version of said oscillations and also having an output circuit coupled to said frequency adjusting means for applying thereto a signal potential varying according to variation of the frequency of said oscillations from a desired frequency, whereby said source is adjusted to suppress said variation from said desired frequency, means for coupling said source to said input circuit, and means operative in synchronism with the intermittent operation of said source for rendering said coupling means inoperative during intervals between transmission periods whereby said frequency sensitive means is rendered incapable of receiving extraneous signals during said intervals.

24. Electrical frequency control apparatus comprising an intermittently operating source of ultra-high frequency oscillations, an ultra-high frequency oscillator having a voltage-sensitive frequency controlling element, a mixer coupled to said source and said oscillator for deriving a heterodyne signal of frequency equal to the difference of frequencies of said source and said oscillator and frequency responsive means having an input circuit coupled to said mixer to receive said heterodyne signal and also having an output circuit coupled to said element to vary the frequency of said oscillator in a manner to suppress variations of said heterodyne signal frequency from a desired frequency, and means for blocking said input circuit to the passage of high frequency waves and in synchronism with the intermittent operation of said source, whereby said circuit is in conductive condition only during periods of operation of said source.

25. In combination, in a carrier wave pulse system, a carrier wave pulse transmitter, a carrier wave pulse receiver having a local oscillator, said receiver being arranged to receive the carrier wave pulses transmitted by said transmitter and to combine them with oscillations produced by said local oscillator to produce a beat frequency, means responsive to said beat frequency to control the frequency of oscillations produced by said local oscillator to maintain said beat frequency constant irrespective of variation in frequency of the carrier wave of the transmitted pulses, and means to maintain said last means normally inoperative and to render it operative only during said transmitted pulses.

26. In combination, a carrier wave pulse transmitter, a receiver arranged to receive the carrier wave pulses transmitted thereby, said receiver having a local oscillator heterodyning with said received carrier wave pulses to produce oscillations of a beat frequency, a frequency discriminator, normally inoperative means to supply said oscillations of said beat frequency to said discriminator, means controlled by said discriminator to regulate the frequency of said local oscillator to maintain said beat frequency constant, and means to render operative said normally inoperative means during the period of each transmitted pulse.

27. In combination, means to transmit oscillations in recurrent pulses, means to receive said oscillations both directly and after reflection from a remote body, a local oscillator heterodyning with said received oscillations to produce a beat frequency, means to produce a unidirectional potential of value dependent upon said beat frequency when said oscillations are received directly, means to maintain said unidirectional potential throughout reception of said oscillations after reflection, and means to regulate the frequency of said local oscillator in accord with said unidirectional potential.

28. In combination, means to transmit oscillations in recurrent pulses, means to receive said oscillations both directly and after reflection from a remote body, an oscillator heterodyning with said received oscillations to produce a beat frequency, said oscillator comprising an electron discharge device having a cathode and another electrode and being adapted to produce oscillations of frequency dependent upon the potential between said electrode and cathode, means to produce a unidirectional potential between said electrode and cathode dependent upon the frequency of said beat note produced only during reception of said directly received oscillations, and means to maintain said potential throughout the interval between said transmitted pulses and during reception of said oscillations after reflection.

29. In combination, a source of wave energy, means including a source of pulses for modulating said wave energy, a frequency control network coupled to said source of wave energy, for stabilizing the frequency thereof, and means including a circuit from said source of pulses to said network for intermittently disabling said network.

30. In combination, a source of wave energy, means for intermittently modulating said energy, a frequency control network responsive to energy from said source for stabilizing the frequency of said energy, and means controlled by said modulating means for intermittently coupling said network to said source.

(References on following page)

References Cited in the file of this patent

UNITED STATES PATENTS

| Number | Name | Date |
|---|---|---|
| 2,055,883 | Terry | Sept. 29, 1936 |
| 2,088,203 | Hansell | July 27, 1937 |
| 2,115,813 | Jarvis | May 3, 1938 |
| 2,123,716 | Crosby | July 12, 1938 |
| 2,134,716 | Gunn | Nov. 1, 1938 |
| 2,138,042 | Robinson | Nov. 29, 1938 |
| 2,165,690 | Wademan | July 11, 1939 |
| 2,194,557 | Keall | Mar. 26, 1940 |
| 2,223,995 | Kotowski et al. | Dec. 3, 1940 |
| 2,296,101 | Foster | Sept. 15, 1942 |
| 2,300,189 | Wolff | Oct. 27, 1942 |
| 2,361,625 | Hansell | Oct. 31, 1944 |
| 2,405,238 | Seeley | Aug. 6, 1946 |
| 2,407,644 | Benioff | Sept. 17, 1946 |
| 2,415,095 | Varian | Feb. 4, 1947 |
| 2,419,527 | Bartelink | Apr. 29, 1947 |
| 2,422,083 | Crosby | June 10, 1947 |
| 2,421,020 | Earp | May 27, 1947 |
| 2,423,023 | Hershberger | June 24, 1947 |
| 2,433,681 | Blumlein | Dec. 30, 1947 |

FOREIGN PATENTS

| Number | Country | Date |
|---|---|---|
| 480,572 | Great Britain | Feb. 24, 1938 |
| 111,594 | Australia | Oct. 1940 |
| 113,233 | Australia | June 2, 1941 |